April 7, 1953  M. W. KLEIN  2,634,031
MULTIPLE TIE RACK
Filed Jan. 18, 1949
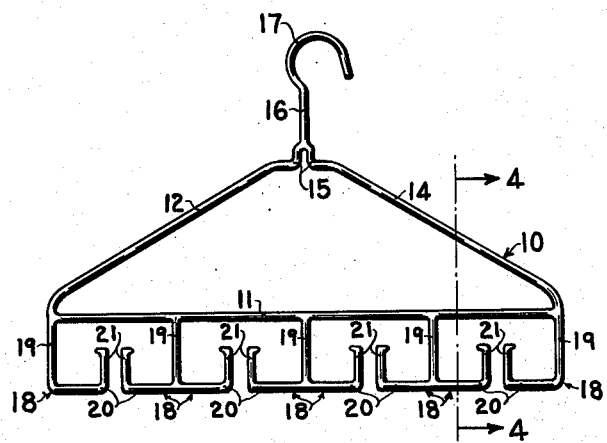
Fig. 1.
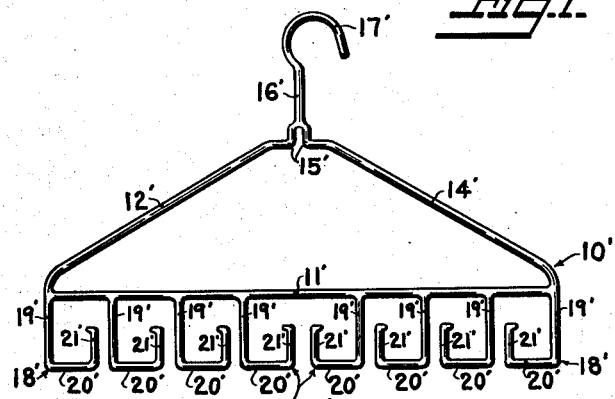
Fig. 2.
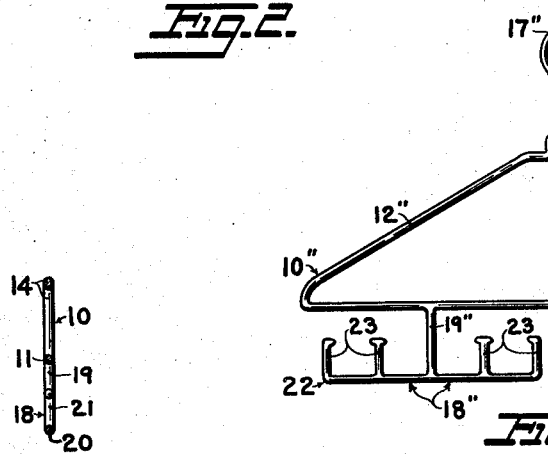
Fig. 3.
Fig. 4.
INVENTOR.
MORRIS W. KLEIN
BY
ATTORNEY Patented Apr. 7, 1953

2,634,031

UNITED STATES PATENT OFFICE 2,634,031

MULTIPLE TIE RACK

Morris W. Klein, Newark, N. J.

Application January 18, 1949, Serial No. 71,439

1 Claim. (Cl. 223—88)

This invention relates to new and useful improvements in utility racks, and, more particularly, the aim is to provide a novel and valuable such rack, especially for use in a man's living quarters, in hotel rooms and elsewhere, and characterized by a combination utility article which is at once a coat and/or vest and/or trousers hanger and a rack for hanging cravats or neckties in a manner to allow each one of the latter to be separately inspected before removal from the rack and for individually carrying the various ties so that each may be, as it were, in a separate compartment.

An attainment of the invention is the provision of a combination utility article having the advantages above, and which also is of light weight, of minimum thickness or dimension perpendicular to its general expanse, and practicable of manufacture at very low cost. Desirably, in this connection, the new article is of one piece construction, and so constituted that it may be formed of a single piece of sheet metal, or, even more desirably, so constituted that it may be molded from such inexpensive plastics as those in the styrene class, with the advantage here that there will be no waste of material except as to the usual small amount of plastic scrap and which latter, as is well known, is reusable.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 illustrates the rack constructed in accordance with the present invention.

Fig. 2 illustrates a modification of the rack.

Fig. 3 illustrates still another embodiment of the invention.

Fig. 4 is a vertical sectional view taken on the line 4—4 of Fig. 1.

Referring in detail to the drawing, the rack is of such exceedingly simple construction that it may be very briefly described, and then in a way to make self-evident the advantages thereof above noted.

The new article as shown in Fig. 1 is as a whole designated 10, as the same is shown in Fig. 2 it is as a whole designated 10', and as the same is shown in Fig. 3 it is as a whole designated 10".

The structure of Fig. 1 will be described in connection with the reference numerals there added; it being understood that in Fig. 2 the parts to which are applied reference numerals with primes added correspond, respectively, to the parts of Fig. 1 to which are applied the same reference numerals without primes, and that in Fig. 3 the parts to which are applied reference numerals with double primes added correspond, respectively, to the parts of Fig. 1 to which are applied reference numerals without primes.

The utility rack of Fig. 1 comprises at its upper part a main lower bar portion 11, a pair of upwardly converging inclined arms 12 and 14, these having inwardly concavely curvilinearly extending upper terminal subdivisions 15 rising to meet and there merging, above which merger is the stem portion 16 providing the shank of a hook 17. The new article, as so far described, it will be noted, has its various portions arranged to suggest the characteristic appearance of a familiar so-called coat hanger made of a single length of wire bent intermediate its ends to establish a main lower bar portion and also arm portions corresponding in function respectively to the bar and arm portions 11, 12 and 14 just above mentioned. The said subdivisions 15 correspond to formations typical of the bent-wire coat hanger now being referred to and located on the latter adjacent to the lower terminus of an intertwisting of the portions of said wire length to establish a triangular frame corresponding to the frame 11—12—14; and the stem 16 and hook 17 represent the formation given to an end portion of said wire length extended beyond the upper terminus of the intertwisting just mentioned.

Thus the new article may at first glance have a familiar appearance psychologically pleasing because of its close resemblance to a time-honored and long satisfactorily used utility device, yet the new article may be uniplanar at opposite parallelly extending sides, and of very little thickness, and, furthermore, free of such apparel-injuring projections as are sometimes encountered at said intertwisting.

The tie-rack feature of the new article is comprised of a suitable plurality, here shown as eight in number, of the tie receiving "compartments." Each such compartment is shown as in the form of an L-shaped hook 18 depending from the bar portion 11. These hooks, both as to the vertical limbs 19 and also as to the horizontal limbs 20 of such L's, may also be uniplanar with the main upper portion of the new article. Preferably, further, each of said hooks includes an upwardly extending bill 21, as shown, thereby really to make each such hook J-shaped rather than L-shaped; and desirably, also, the upper end of the bill 21 is enlarged somewhat in the plane of expanse of the new article.

A separate necktie or cravat may be draped on each of these hooks 18, with the certainty that no tie will be creased, crushed, rumpled or in any way injured, that all the ties present may be given a quick comparison and pre-choice inspection, and that any selected tie may be easily withdrawn from and later easily replaced without disturbing any of the other ties.

In Fig. 1, each two adjoining hooks 18 have a common vertical limb 19; that is, each such pair of hooks 18 combine to form an integral structure of inverted-T outline, with their said common vertical limb constituting the staff of the T.

In Fig. 2, each hook 18' has its own separate and individual vertical limb 19'.

In Fig. 3, a common vertical limb 19" is provided for a greater plurality of hooks than two. Here, for example, and not by way of limitation, the number of hooks carried by such a limb may be any multiple of two, such that what may be called inverted combs are provided. Each such comb as a whole is in Fig. 3 marked 22; each such comb having four upstanding teeth 23, with two of the latter at each side of the limb 19" of the comb.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A utility rack forming part of a coat hanger having a horizontal bar portion, comprising a pair of laterally spaced limbs depended vertically from the bar portion at points midway between the center and the outer ends of the horizontal bar portion, horizontal arms supported intermediate of their ends on the bottom ends of said limbs and extended parallel to the bar portion, said horizontal arms being end aligned and each of a length slightly less than one-half the length of the horizontal bar portion leaving a space between the adjacent inner ends of said horizontal arms, and spaced teeth extended upward from said arms on opposite sides of said limbs and extended parallel to said limbs, said teeth being shorter than said limbs providing a clearance between the top ends of said teeth and the horizontal bar.

MORRIS W. KLEIN.

REFERENCES CITED

The following references are of record in the file of this patent:

UNITED STATES PATENTS

| Number | Name | Date |
|---|---|---|
| D. 91,319 | Falk | Jan. 9, 1934 |
| 1,910,629 | Navarte | May 23, 1933 |
| 1,981,553 | Jackson | Nov. 20, 1934 |